Patented Aug. 17, 1948

2,447,326

UNITED STATES PATENT OFFICE 2,447,326

RECOVERY OF FLUOSULFONIC ACID AND USE AS CONDENSING AGENT IN PRODUCTION OF DDT

Charles W. Gates and William P. Woods, Elmira, Ontario, Canada, assignors to United States Rubber Company, New York, N. Y., a corporation of New Jersey No Drawing. Application August 13, 1947, Serial No. 768,490. In Canada May 17, 1947

7 Claims. (Cl. 260—649)

This invention relates to a method of recovering fluosulfonic acid from spent acid containing the same in admixture with sulfuric acid and hydrogen fluoride. In its most important aspect it relates to a method of recovering fluosulfonic acid which has become spent as a result of use as the condensing agent for chemical condensations which liberate water, particularly spent fluosulfonic acid formed in the manufacture of 2,2-bis (p-chlorophenyl)-1,1,1-trichloroethane by the condensation of monochlorobenzene with chloral using fluosulfonic acid as the condensing agent.

DDT (2,2-bis(p-chlorophenyl)-1,1,1-trichloroethane) is commonly prepared by reacting together chloral or chloral hydrate with monochlorobenzene. Since water is one of the products of the reaction, a strong condensing or dehydrating acid is used to pick up this water and favorably displace the equilibrium. For this purpose, strong sulfuric acid or oleum, or a mixture of sulfuric acid and oleum, are used industrially. Chlorosulfonic acid and fluosulfonic acid are also used as acid condensing agents for the DDT synthesis which is conveniently represented by the following equation:

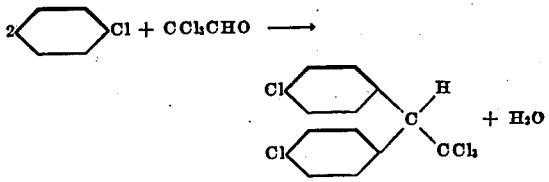

When fluosulfonic acid is employed as a condensing agent it acts as a dehydrating agent in accordance with the following equation:

$$2HSO_3F + H_2O \rightarrow H_2SO_4 + HF + HSO_3F$$
(Excess)        (DDT spent acid mixture)

During the reaction hydrogen fluoride is not evolved but remains in the spent acid. The presence of this hydrogen fluoride and of fluosulfonic acid in the spent acid creates a serious waste disposal problem in addition to representing a loss of valuable fluosulfonic acid. The principal object of the present invention is to recover fluosulfonic acid from this spent acid. Another object is to recover not only the fluosulfonic acid present as such in the spent acid but also to convert the free hydrogen fluoride in the spent acid to fluosulfonic acid and to recover the latter fluosulfonic acid. Another object is to eliminate the waste disposal problem presented by the spent fluosulfonic acid. Another object is to accomplish the recovery of the fluosulfonic acid in a manner which eliminates the introduction of non-volatile material. Our invention not only accomplishes the foregoing objects but also effects a major economic improvement in the synthesis of DDT with fluosulfonic acid as the condensing agent.

The copending application of Marshall Kulka Serial No. 768,485, filed of even date herewith discloses and claims the broad discovery that fluosulfonic acid can be recovered from the spent acid in a form suitable for re-use by admixing sulfur trioxide therewith and then distilling the mixture to recover the fluosulfonic acid as the distillate. Said application describes the use of sulfur trioxide as such and of sulfur trioxide in the form of a solution thereof in sulfuric acid, that is fuming sulfuric acid or oleum. However the use of sulfur trioxide in these forms is not entirely satisfactory and an additional object of the present invention is to provide a method which overcomes the disadvantages of using sulfur trioxide either as such or as fuming sulfuric acid. Among those disadvantages are that sulfur trioxide as such cannot be readily handled or shipped so that its use is commercially impractical unless the DDT plant is located next to a source of sulfur trioxide while fuming sulfuric acid introduces a relatively large amount of additional sulfuric acid into the mixture which represents a loss and gives more sulfuric acid in the residue to be disposed of.

We have discovered a method of converting the hydrogen fluoride content in the spent fluosulfonic acid to fluofonic acid and recovering this fluosulfonic acid together with the excess initial fluosulfonic acid in a purified state suitable for re-use as the condensing agent for further DDT formation which overcomes the foregoing objections.

We have now found that fluosulfonic acid can be recovered from the spent fluosulfonic acid by admixing fluosulfonic acid containing free sulfur trioxide with the spent acid, distilling the resulting mixture and recovering fluosulfonic acid as the distillate.

Sulfur trioxide is very soluble in fluosulfonic acid, giving a solution which may be termed fuming fluosulfonic acid or fluoleum.

The use of sulfur trioxide in the form of a solution of sulfur trioxide in fluosulfonic acid in accordance with the present invention is very advantageous over the use of sulfur trioxide as such since it provides a very convenient method of supplying the sulfur trioxide required for the recovery of the hydrogen fluoride content of the spent acid and over the use of fuming sulfuric acid since it does not add to the sulfuric acid residue from the recovery distillation as does oleum. It has the additional advantage of adding make-up fluosulfonic acid for the DDT synthesis. By using fluoleum of the correct proportions of $SO_3$ to $HSO_3F$ the amount of recovered fluosulfonic acid can be kept in balance with requirements for the DDT synthesis. In this way a fully integrated economical process for the synthesis of DDT with fluosulfonic acid as the condensing agent can be provided.

The hydrogen fluoride content of the spent fluosulfonic acid is, in accordance with our invention, converted to fluosulfonic acid by sulfur trioxide in the form of a solution thereof in fluosulfonic acid. The reaction is as follows:

$$HF + (HSO_3F + SO_3) \rightarrow 2HSO_3F$$
Fuming fluosulfonic acid

In the practice of our invention, the spent fluosulfonic acid is simply mixed with the fuming fluosulfonic acid to give a uniform homogeneous mixture and the resulting mixture is then distilled, the fluosulfonic acid contained in the mixture being recovered as the distillate.

The concentration of sulfur trioxide in the fuming fluosulfonic acid used in accordance with the present invention may vary within wide limits, say from 10 to 60% by weight of $SO_3$ based on the total weight of fuming fluosulfonic acid, depending upon a number of factors including availability, the amount of make-up fluosulfonic acid desired to be introduced into the system, and the amount of free hydrogen fluoride in the spent fluosulfonic acid. In a commercial operation for synthesizing DDT with fluosulfonic acid as the dehydrating agent and including the fluosulfonic recovery system of the present invention, a balance will be achieved, after steady-state operation is reached, between degree of spending in the DDT synthesis and amount and $SO_3$ concentration of fuming fluosulfonic acid added in the regeneration and recovery system.

Fuming fluosulfonic acid is very easily prepared by simply dissolving $SO_3$ in fluosulfonic acid to the desired concentration. The sulfur trioxide may be introduced in liquid form or in gaseous form. For example gaseous sulfur trioxide made at a contact plant may be simply bubbled through fluosulfonic acid until the desired level of $SO_3$ concentration is reached. The resulting fuming fluosulfonic acid may be conveniently shipped and handled and provides a very satisfactory method of supplying sulfur trioxide for fluosulfonic regeneration and recovery.

Fluosulfonic acid is an article of commerce and is readily available. Commercial fluosulfonic acid is shipped containing a slight excess of $SO_3$ (about 3%) in order to prevent corrosion on the container. If it contained free HF, there would be corrosion on iron or etching of glass containers. The fuming fluosulfonic acid used in accordance with our invention may be shipped in the same containers as are used for fluosulfonic acid. The containers should of course be closed and preferably are capable of withstanding pressure such as would be generated upon subjecting the fuming acid, especially those forms containing the higher concentrations of $SO_3$, to elevated pressures as would be the case when a cylinder or tank car were exposed to the hot sun.

The amount of fuming fluosulfonic acid admixed with the spent fluosulfonic acid may vary widely depending upon many factors including the proportion of free hydrogen fluoride in the spent acid and the proportion of free sulfur trioxide in the fuming fluosulfonic acid. It is often preferred to introduce at least enough sulfur trioxide to combine chemically with all of the free hydrogen fluoride present in the spent acid. This means that in order to secure maximum recovery of fluosulfonic acid the amount of added free sulfur trioxide in the added fluosulfonic acid should be at least stoichiometrically equivalent to the free hydrogen fluoride in the spent acid. Employment of a great excess of sulfur trioxide above the stoichiometrical equivalent of the free hydrogen fluoride is undesirable because this excess sulfur trioxide is lost upon distillation. In general we prefer to employ enough fuming fluosulfonic acid to supply free sulfur trioxide in an amount ranging from 0.9 to 1.1 mols of $SO_3$ per mol of free HF in the spent acid. Still more preferably we employ enough fuming fluosulfonic acid to furnish between 1.0 and 1.1 mols of free $SO_3$ per mol of free HF.

The addition of the fuming fluosulfonic acid may be accompanied by agitation in order to promote the formation of a homogeneous mixture. The free sulfur trioxide thus introduced reacts with the free hydrogen fluoride almost instantaneously. The addition may be carried out at any suitable temperature, the use of ordinary room temperature generally being preferred. Since the reaction between the added sulfur trioxide and the free hydrogen fluoride evolves heat, it may be desirable or necessary to cool in any suitable manner during the addition and admixture of the fuming fluosulfonic acid. As will be obvious to those skilled in the art, corrosion-resistant equipment should be used for carrying out the admixture and the subsequent distillation step.

As soon as the fuming fluosulfonic acid has been intimately commingled with the spent fluosulfonic acid, the resulting mixture may be distilled and fluosulfonic acid in substantially pure form is recovered as the distillate. The fluosulfonic acid thus recovered comprises fluosulfonic acid from three sources, namely, the unspent fluosulfonic acid present in the initial spent acid, the fluosulfonic acid present in the added fuming fluosulfonic acid and the fluosulfonic acid formed by interaction of the sulfur trioxide and the hydrogen fluoride in the initial spent acid. The distillation may be carried out in any manner known to those skilled in the art. We may employ either a simple pot still equipped with a condenser, or a fractional distillation column equipped with packing or bubble plates and with conventional means for reboiling the kettle and for refluxing the top of the column.

It is preferable to distill the treated spent acid under reduced pressure in order to bring the distillation temperature to a convenient operating range. For example a bath or kettle temperature of 150° C. is sufficient to carry out the distillation of the fluosulfonic acid rapidly at from 10 to 20 mm. pressure.

By carrying out the distillation under reduced pressure such that the fluosulfonic acid is not subjected to a temperature above 150° C., decomposition of the fluosulfonic acid is prevented. Ordinarily it is preferable to carry out the distillation at a pressure of not over 30 millimeters of mercury absolute. The boiling point of fluosulfonic acid at atmospheric pressure is reported to be 165.5° C. but it cannot be distilled at atmospheric pressure without more or less decomposition.

The distillation resolves the treated spent acid mixture into three separate fractions, namely:

(1) A non-condensable gaseous fraction containing any excess sulfur trioxide together with non-condensable gases present in the mixture such as hydrogen chloride derived from by-products of the DDT reaction remaining in the spent acid, possibly sulfur dioxide derived by decomposition or side reactions, free hydrogen fluoride if less than the stoichiometric equivalent of $SO_3$ was introduced, and the like. This non-condensable gaseous fraction comes overhead first and is usually disposed of through the vacuum source. Where a conventional fractional distillation column is employed for conducting the distillation step, the non-condensable fraction separates from the fluosulfonic acid after the condenser operating on the overhead vapors. This non-condensable gas may be withdrawn from the condensate accumulator. Generally it will be preferred to apply the vacuum to the vapor space in the condensate accumulator and thus to discharge the non-condensable gas through the vacuum source, which may be a vacuum pump or other means of pulling the desired vacuum.

(2) A fraction of substantially pure fluosulfonic acid boiling at from 95–150° C. at 10–20 mm. pressure.

(3) A non-volatile fraction comprising the residual material, namely sulfuric acid and by-products of the DDT reaction, for example p-chlorobenzenesulfonic acid, bis-p-chlorophenyl sulfone, etc.

The process of the present invention may be operated either in a batch-wise fashion or in a continuous manner, the latter being preferred. Continuous operation is conveniently effected by simply continuously admixing the fuming fluosulfonic acid with the spent fluosulfonic acid and continuously running the resulting mixture into a continuously operated distillation unit.

The spent fluosulfonic acid layer is generally derived from the reaction mixture whereby DDT is made by simply allowing separation of this reaction mixture by gravity into a clear brown lower acid layer and an upper organics layer containing the DDT. The spent acid may contain sulfuric acid, free hydrogen fluoride and unchanged fluosulfonic acid, together with small amounts of by-products. The proportions of hydrogen fluoride and sulfuric acid contained in the spent acid will depend upon the extent to which spending thereof has occurred. It will be understood that generally spending of the fluosulfonic acid must be limited since otherwise the DDT reaction is slowed up to an objectionable extent. Generally speaking the spent fluosulfonic acid treated in accordance with the present invention will contain from 30 to 70% of fluosulfonic acid, from 5 to 15% of hydrogen fluoride and from 15 to 45% of sulfuric acid, these percentages being by weight. The spent acid will usually also contain from 5 to 20% of impurities, such as side reaction products of the DDT process. It will be understood that the spending of the fluosulfonic acid produces equimolecular proportions of hydrogen fluoride and sulfuric acid, in accordance with the equation given above. This means that the percentage of sulfuric acid in the spent acid will usually be from 3 to 4.9 times the percentage of hydrogen fluoride.

Following is a specific example of the practice of our invention:

Spent fluosulfonic acid derived from the preparation of DDT by the condensation of monochlorobenzene with chloral with fluosulfonic acid as the condensing agent had the following approximate analysis, the percentage being by weight.

| | Per cent |
|---|---|
| $HSO_3F$ | 62 |
| $HF$ | 6.8 |
| $H_2SO_4$ | 21 |
| Side reaction products | 10.2 |

To 230 parts of this spent acid was added 115 parts of fluoleum (containing 46% of $HSO_3F$ and 54% $SO_3$) and the resulting solution was distilled under 20 mm. of mercury absolute pressure. The distillate or recovered fluosulfonic acid amounted to 265 parts giving a 96.1% recovery of available fluosulfonic acid including (1) the fluosulfonic present in the original spent acid, (2) the fluosulfonic added in the form of fuming sulfuric acid and (3) the fluosulfonic acid formed by interaction of the free HF and the added $SO_3$. The residue was 66.6 parts or 28.9% of the original spent acid.

It will of course be understood that we are not limited to spent acid of the analysis given above as this analysis may vary considerably depending upon many factors including times, temperatures, ratios of materials, etc., which may all be varied but will still yield a spent fluosulfonic acid recoverable by our method. We believe that we are first to provide a process wherein fluosulfonic acid is decomposed during the condensation reaction by water liberated by the reaction and is then recovered for re-use in the reaction by the use of fuming fluosulfonic acid. The fluosulfonic acid can be recovered in exceptionally good yields by our process. The process is applicable to recovering the fluosulfonic acid repeatedly and indefinitely. Thus for example DDT may be prepared with fluosulfonic acid, the spent acid treated in accordance with the present invention and the recovered fluosulfonic acid used again in the condensing reaction and the spent acid from the second use again treated with sulfur trioxide and re-used, this sequence being kept up indefinitely.

We are not limited to the type of distillation used to effect the recovery of the fluosulfonic acid in accordance with the present invention since various methods for this unit operation may be employed including both batch and continuous distillation. In the continuous distillation, it may be preferred to run the treated spent fluosulfonic acid into the column and effect a flash distillation of the fluosulfonic acid as the distillate while the sulfuric acid residue drops to the still pot and is removed.

All percentages and parts referred to herein are by weight.

From the foregoing description many advantages of the process of the present invention will be apparent to those skilled in the art. Among those advantages are the provision of a simple and commercially feasible method of recovering fluosulfonic acid from spent fluosulfonic acid in high yields. Another advantage is that the equipment requirements for the process of the present invention are simple, it being necessary only to use corrosion-resistant mixing and distilling equipment. Such equipment may conveniently be made of aluminum or aluminum alloys, or of corrosion-resistant steel such as stainless steel. The method of the present invention is particularly advantageous when applied to the manufacture of DDT with fluosulfonic acid as the condensing agent. When fluosulfonic acid is employed to effect the manufacture of DDT, the process is not commercially feasible if the spent acid has to be discarded. However, by applying the process of the present invention to recover the fluosulfonic acid the use of this acid as the condensing agent for DDT manufacture assumes commercial importance. Another advantage of the present invention is that it effects recovery not only of the unspent fluosulfonic acid contained in the spent acid but also the fluosulfonic acid present in the added fuming fluosulfonic acid as well as that formed from the free hydrogen fluoride in the spent acid. Another advantage is that the employment of fuming fluosulfonic acid provides a convenient method of adding sulfur trioxide and eliminates the introduction of sulfuric acid which is involved when fuming sulfuric acid is the source of the sulfur trioxide. Many other advantages of our invention will be apparent to those skilled in the art.

Having thus described our invention, what we claim and desire to protect by Letters Patent is:

1. The process of recovering fluosulfonic acid from spent acid comprising the same in admixture with sulfuric acid and hydrogen fluoride which comprises admixing fluosulfonic acid containing free sulfur trioxide with said spent acid, distilling the resulting mixture and recovering fluosulfonic acid as the distillate.

2. The process of recovering fluosulfonic acid from spent acid which has been formed in the manufacture of 2,2-bis(p-chlorophenyl)-1,1,1-trichloroethane by reaction of chloral with monochlorobenzene with fluosulfonic acid as the condensing agent, which spent acid comprises sulfuric acid, fluosulfonic acid and hydrogen fluoride, which comprises admixing fluosulfonic acid containing free sulfur trioxide with said spent acid, distilling the resulting mixture and recovering fluosulfonic acid as the distillate.

3. The process of recovering fluosulfonic acid from spent acid comprising the same in admixture with sulfuric acid and hydrogen fluoride which comprises admixing a material consisting essentially of fluosulfonic acid containing free sulfur trioxide with said spent acid, distilling the resulting mixture and recovering fluosulfonic acid as the distillate.

4. The process of claim 3 wherein the amount of said free sulfur trioxide is at least stoichiometrically equivalent to the free hydrogen fluoride in the spent acid.

5. The process of recovering fluosulfonic acid from spent acid containing the same in admixture with sulfuric acid and hydrogen fluoride which comprises admixing fluosulfonic acid containing free sulfur trioxide with said spent acid, distilling the resulting mixture at a pressure of not over 30 millimeters of mercury absolute and recovering fluosulfonic acid as the distillate, said recovered fluosulfonic acid comprising fluosulfonic acid derived from the original spent acid, from the reaction of said sulfur trioxide with said hydrogen fluoride and from said added fluosulfonic acid.

6. A process which comprises effecting a chemical condensation which liberates water with fluosulfonic acid as the condensing agent, the liberated water decomposing the fluosulfonic acid and thereby spending the same, withdrawing the spent fluosulfonic acid, admixing fluosulfonic acid containing free sulfur trioxide with the spent fluosulfonic acid, distilling the resulting mixture and recovering fluosulfonic acid as the distillate, and returning the thus-recovered fluosulfonic acid to re-use in said condensation.

7. A process of producing 2,2-bis(p-chlorophenyl)-1,1,1-trichloroethane which comprises condensing monochlorobenzene with chloral with fluosulfonic acid as the condensing agent, the water liberated by the condensation decomposing the fluosulfonic acid and thereby spending same, withdrawing the spent fluosulfonic acid, admixing fluosulfonic acid containing free sulfur trioxide with the spent fluosulfonic acid, distilling the resulting mixture and recovering fluosulfonic acid as the distillate, and returning the thus-recovered fluosulfonic acid to re-use in said condensation.

CHARLES W. GATES.
WILLIAM P. WOODS.